(12) United States Patent
Tinnin et al.

(10) Patent No.: US 8,783,717 B2
(45) Date of Patent: Jul. 22, 2014

(54) STEERING COLUMN TELESCOPE LOCK

(75) Inventors: Melvin Lee Tinnin, Clio, MI (US);
Kevin M Burns, Flushing, MI (US);
John Frank Schulz, Saginaw, MI (US);
Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 386 days.

(21) Appl. No.: 12/952,966

(22) Filed: Nov. 23, 2010

(65) Prior Publication Data
US 2012/0125139 A1 May 24, 2012

(51) Int. Cl.
*B62D 1/19* (2006.01)
*B62D 1/185* (2006.01)

(52) U.S. Cl.
USPC ............................................. 280/777; 74/493

(58) Field of Classification Search
USPC ..................... 74/492, 493; 280/775, 777
See application file for complete search history.

(56) References Cited

U.S. PATENT DOCUMENTS

| 4,793,204 | A | * | 12/1988 | Kubasiak | 74/493 |
| 5,029,489 | A | * | 7/1991 | Burmeister et al. | 74/493 |
| 5,524,927 | A | * | 6/1996 | Toussaint | 280/777 |
| 5,820,163 | A | * | 10/1998 | Thacker et al. | 280/775 |
| 6,139,057 | A | * | 10/2000 | Olgren et al. | 280/775 |
| 6,851,332 | B2 | * | 2/2005 | Bechtel et al. | 74/493 |
| 7,293,481 | B2 | * | 11/2007 | Li et al. | 74/493 |
| 7,735,868 | B2 | * | 6/2010 | Ridgway et al. | 280/775 |
| 8,047,096 | B2 | * | 11/2011 | Ridgway et al. | 74/493 |
| 2005/0199087 | A1 | * | 9/2005 | Li et al. | 74/493 |
| 2006/0181070 | A1 | * | 8/2006 | Imamura et al. | 280/777 |
| 2006/0207379 | A1 | * | 9/2006 | Riefe et al. | 74/492 |
| 2006/0273568 | A1 | * | 12/2006 | Manwaring et al. | 280/777 |
| 2007/0235998 | A1 | * | 10/2007 | Demmon et al. | 280/775 |
| 2010/0282016 | A1 | * | 11/2010 | Oehri et al. | 74/493 |

* cited by examiner

*Primary Examiner* — David M Fenstermacher
*Assistant Examiner* — Terence Boes
(74) *Attorney, Agent, or Firm* — Cantor Colburn LLP

(57) ABSTRACT

A telescope lock mechanism for a steering column includes a plurality of column teeth operably connected to the steering column and an adjustment lever operably connected to the steering column to allow user adjustment of a position of the steering column. A locking bolt extends from the adjustment lever, and a cam is located at the locking bolt and rotatable thereon. The cam includes one or more tab features interactive with the locking bolt such that rotation of the locking bolt engages the tab features with the locking bolt to drive rotation of the cam between a locked and unlocked position. The tab further includes a plurality of cam teeth meshable with the plurality of column teeth when the cam is in a locked position. A spring is operably connected to the cam to maintain the cam position in the locked and/or unlocked position when the cam is rotated thereto.

18 Claims, 7 Drawing Sheets

STEERING COLUMN TELESCOPE LOCK

FIELD OF THE INVENTION

The subject matter disclosed herein relates to steering columns for motor vehicles. More specifically, the subject disclosure relates to a lock mechanism for a telescope adjustment of a steering column.

BACKGROUND

Steering columns for motor vehicles are often provided with mechanisms for adjusting the steering column's position by an operator of the motor vehicle. Available adjustments typically include a tilt or rake adjustment in which an angular position of the steering column is changed relative to the operator, and a telescoping adjustment in which the steering column is extended toward the operator or compacted away from the operator. Telescope of the steering column is adjusted by releasing an adjustment lever from a secured position, which then allows for movement along an axis of the steering column of an upper jacket of the steering column relative to a lower jacket into which the upper jacket is located. Returning the adjustment lever to the secured position retains the upper jacket in a desired set position relative to the lower jacket.

In a vehicle impact situation, the steering column is configured to absorb energy of the impact to prevent or reduce injury to the operator due to impact with the steering wheel. A steering column typically has a crash release load requirement that dictates at which load the steering column should break loose from its constraints and collapse. A lock mechanism is often provided in the steering column to secure the steering column in a chosen telescoped position to maintained controlled energy absorption of the steering column in a crash. Such mechanisms are typically spring loaded such that the spring is coupled to the adjustment lever. As a result, forces necessary to actuate the lever can vary greatly with telescope position of the steering column. Further, such mechanisms typically create unwanted operation noise when adjusting the steering column position.

Accordingly, it is desirable to provide an improved telescope lock mechanism for a steering column.

SUMMARY OF THE INVENTION

In one exemplary embodiment of the present invention, a telescope lock mechanism for a steering column includes a plurality of column teeth operably connected to the steering column and an adjustment lever operably connected to the steering column to allow user adjustment of a position of the steering column. A locking bolt extends from the adjustment lever, and a cam is located at the locking bolt and rotatable thereon. The cam includes one or more tab features interactive with the locking bolt such that rotation of the locking bolt engages the tab features with the locking bolt to drive rotation of the cam between a locked and unlocked position. The tab further includes a plurality of cam teeth meshable with the plurality of column teeth when the cam is in a locked position. A spring is operably connected to the cam to maintain the cam position in the locked and/or unlocked position when the cam is rotated thereto.

In another exemplary embodiment of the present invention, A steering column assembly includes a lower jacket, an upper jacket slidably disposed in the lower jacket, and an adjustment lever operably connected to the upper jacket and/or the lower jacket to allow user adjustment of a position of the upper jacket relative to the lower jacket along a column axis. A telescope lock mechanism is in operable communication with the upper jacket and the lower jacket and includes a plurality of column teeth operably connected to the upper jacket and a locking bolt extending from the adjustment lever. A cam is positioned at the locking bolt and is rotatable thereon. The cam includes one or more tab features interactive with the locking bolt such that rotation of the locking bolt engages the tab features with the locking bolt to drive rotation of the cam between a locked and unlocked position. The cam further includes a plurality of cam teeth meshable with the plurality of column teeth when the cam is in a locked position. A spring is operably connected to the cam to maintain the cam position in the locked and/or unlocked position when the cam is rotated thereto.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
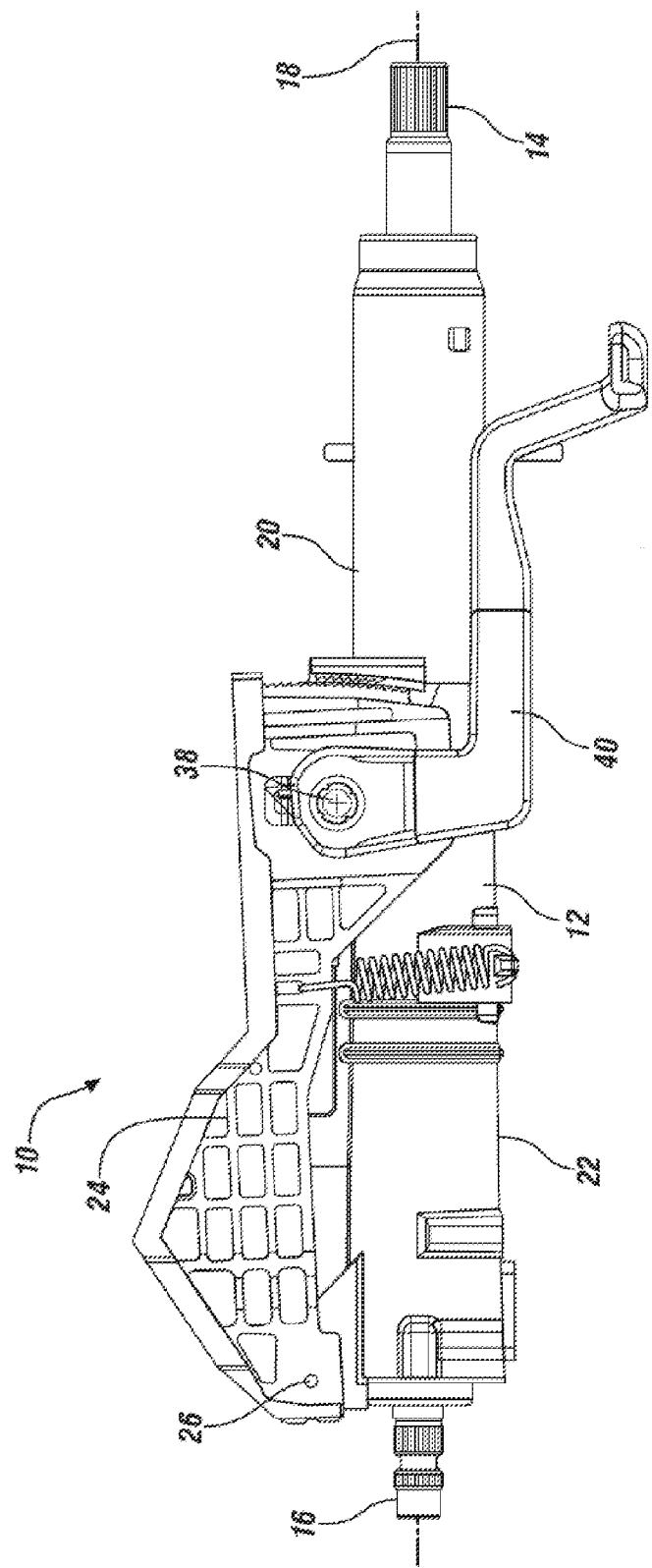
FIG. 1 is a schematic view of an embodiment of a steering column assembly.

In accordance with an exemplary embodiment of the present invention, shown in FIG. 1 is an embodiment of a steering column assembly 10 for a motor vehicle, including at least a telescope adjustment. The steering column assembly 10 includes a column 12 having a first end 14 to which a steering wheel (not shown), or other operator control, is connectable, and a second end 16 which is operably connected to a steering system (not shown) that translates rotational motion of the column 12 about a column axis 18 into steering motion of the motor vehicle. In some embodiments, the column 12 includes an upper jacket 20 extending from the first end 14. The upper jacket 20 is at least partially located in a lower jacket 22 which extends from the second end 16 toward the first end 14. Motion of the upper jacket 20 in the lower jacket 22 along the column axis 18 is a telescopic adjustment of the steering column assembly 10. It is to be appreciated that while in the embodiment of FIG. 1, the upper jacket 20 is at least partially located in the lower jacket 22, in some embodiments, the configuration is substantially reversed, with the lower jacket 22 at least partially located inside the upper jacket 20. The lower jacket 22 is secured to a rake bracket 24 at a pivot 26.

Figure 2:
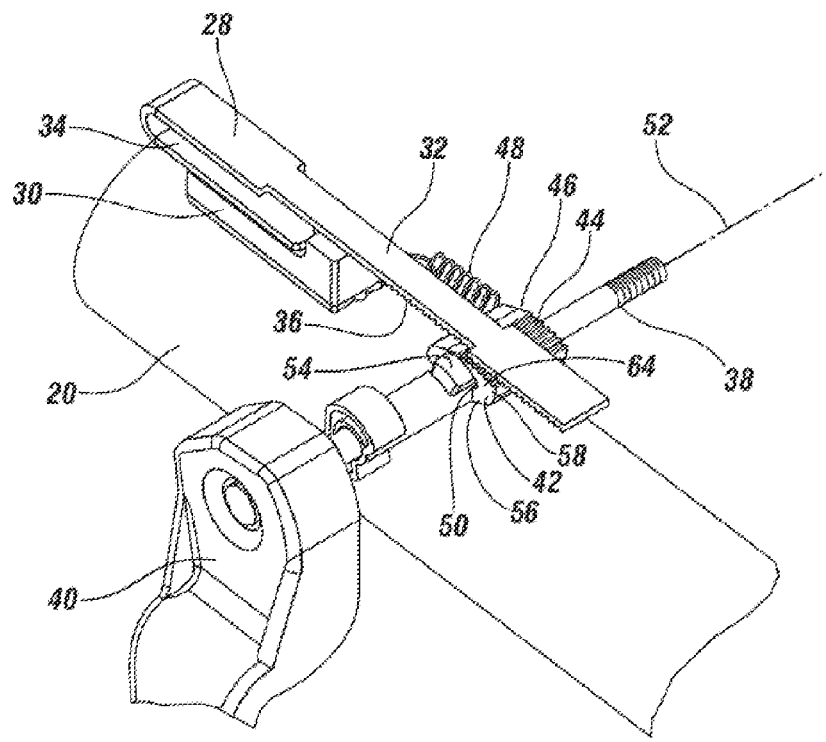
FIG. 2 is a perspective view of an embodiment of a telescope lock mechanism for a steering column assembly.

Referring to FIG. 2, the upper jacket 20 includes an energy-absorbing (EA) strap 28 affixed thereto via, for example an EA retainer 30. The EA strap 28 extends axially along the upper jacket 20 and in some embodiments includes and upper strap leg 32 and a lower strap leg 34, with the lower strap leg 34 secured to the EA retainer 30 via, for example, a bolt, a screw or the like. The EA strap 28 includes a plurality of strap teeth 36 extending across a width of the upper strap leg 32 and extending toward the column axis 18. A locking bolt 38 extends from an adjustment lever 40 through the rake bracket 24 (omitted from this figure for clarity) and across the upper jacket 20 between the upper jacket 20 and the upper strap leg 32. An eccentrically-shaped cam 42 is disposed at the locking bolt 38 laterally between the upper jacket 20 and the upper strap leg 32 and is configured to rotate freely on the locking bolt 38. On an upper face 44 of the cam 42 (the upper face 44 being the face closest to the upper strap leg 32), the cam 42 includes a plurality of cam teeth 46 extending across a width of the cam 42 and outwardly toward the upper strap leg 32. A spring 48 is connected at one end to the cam 42 and at the other end to the lower jacket 22. A bolt driver 50 is located at the locking bolt 38, in some embodiments coaxial with the locking bolt 38, and is secured to the locking bolt 38 as to rotate with the locking bolt 38 about a bolt axis 52. The bolt driver 50 has a driver tab 54 which is at least partially inserted into a cam recess 56 of the cam 42. In some embodiments, the cam recess 56 is located on a lateral face 58 of the cam 42. In some embodiments, the cam recess 56 is configured to have a recess width greater than a tab width of the driver tab 54 so that the driver tab 54 can move some angular distance about the bolt axis 52 without contacting an edge 64 of the cam recess 56.

Figure 3:
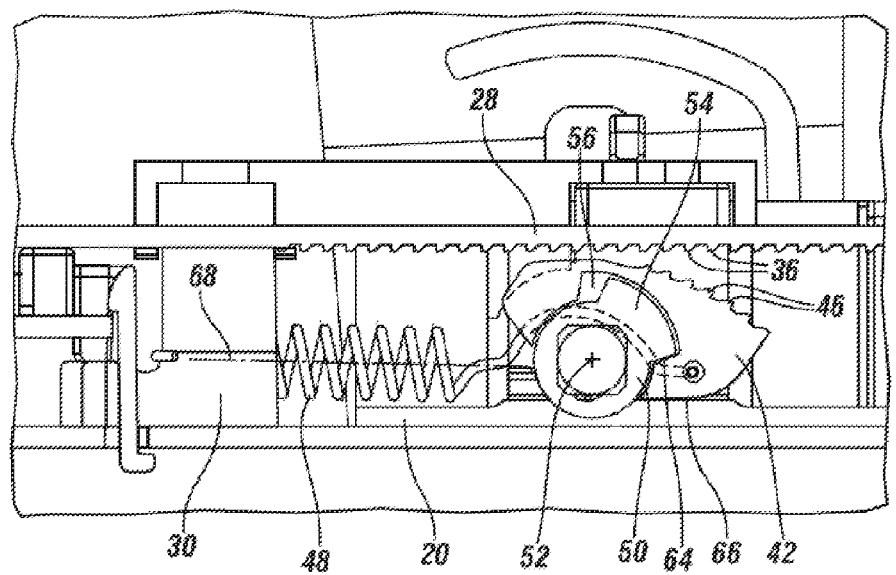
FIG. 3 is a cross-sectional view of an embodiment of a telescope lock mechanism in an unlocked position.

Referring now to FIG. 3, the operation of the lock mechanism will now be described. The lock mechanism is shown in FIG. 3 in an unlocked position, achieved by rotating the adjustment lever 40 to an unlocked position, clockwise in this view. Rotating the adjustment lever 40 to the unlocked position allows adjustment of the steering column 12 position, telescope and/or rake, by the user. When the adjustment lever 40 is rotated to the unlocked position, the locking bolt 38 and bolt driver 50 rotate with the adjustment lever about the bolt axis 52 and contact first recess edge 64. The locking bolt 38 and bolt driver 52 continue to rotate, thus also rotating the cam 42 toward the upper jacket 20 until a leading face 66 of the cam 42 contacts the lower jacket 22, or other component configured to be a stop. With the cam 42 in this position, a spring axis 68 of the spring 48 is between the bolt axis 52 and the upper jacket 20. Thus, with the spring 48 connected to the cam 42 as shown in FIG. 3, between the bolt axis 52 and the leading face 66, the spring 48 acts to hold the leading face 66 in contact with the lower jacket 22, preventing the cam teeth 46 from moving into engagement with the strap teeth 36. The user can then adjust the position of the steering column 12 without noise from inadvertent contact between the cam teeth 46 and strap teeth 36. Further, since the spring 48 is holding the cam 42 in position, no torque is applied to the adjustment lever 40, so no additional effort in moving the adjustment lever 40 is experienced by the user.

Figure 4:
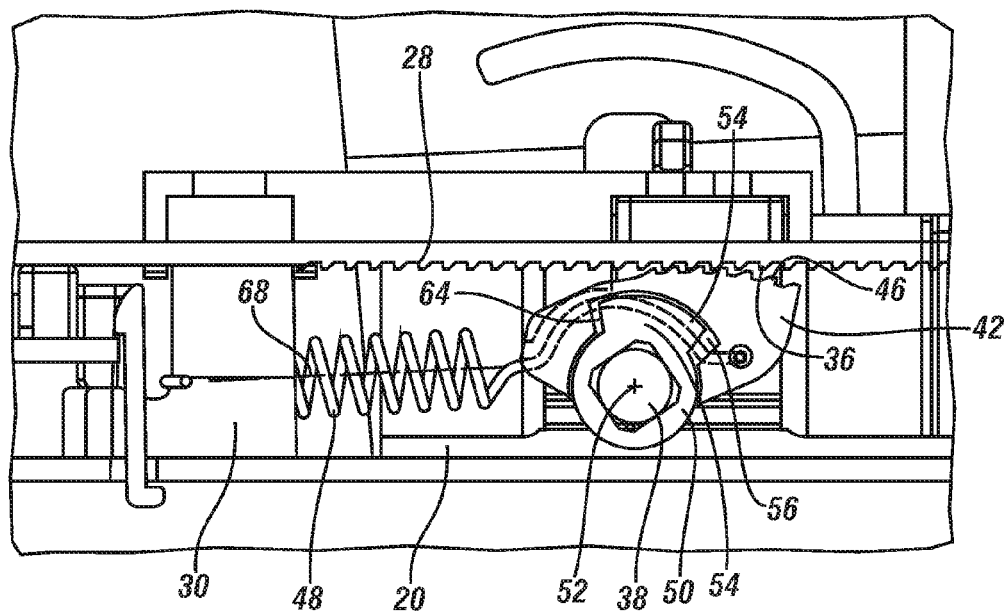
FIG. 4 is a cross-sectional view of an embodiment of a telescope lock mechanism in a locked position.
Figure 5:
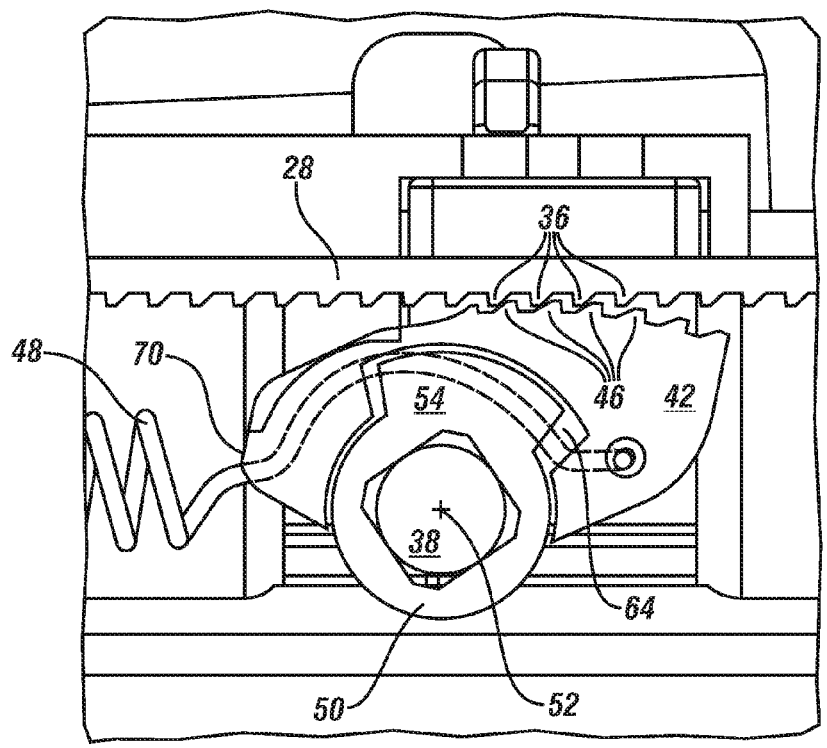
FIG. 5 is an enlarged view of an embodiment of a telescope lock mechanism in a locked position.

Referring to FIG. 4, the mechanism is shown in a locked position. The mechanism is engaged when the user rotates the adjustment lever 40 from the unlocked position to the locked position. When this is done, the locking bolt 38 is rotated counterclockwise thus rotating the bolt driver 50 counterclockwise contacting a second recess edge 64 of the cam 42. As the adjustment lever 40 is continued in rotation, the rotation of the locking bolt 38 drives the cam teeth 46 into contact with the strap teeth 36. In this position, the spring axis 68 is located between the bolt axis 52 and the EA strap 28, and thus acts to retain the cam teeth 46 in contact with the strap teeth 36. Referring now to FIG. 5, now that the adjustment lever 40 is in the locked position, the strap teeth 36 and cam teeth 46 are now aligned so that a sufficient crash release load acting on the steering column 12 will cause the strap teeth 36 to engage the cam teeth 46, thus locking the telescope position of the steering column 12 to obtain increased control of energy absorption throughout the impact.

Figure 6:
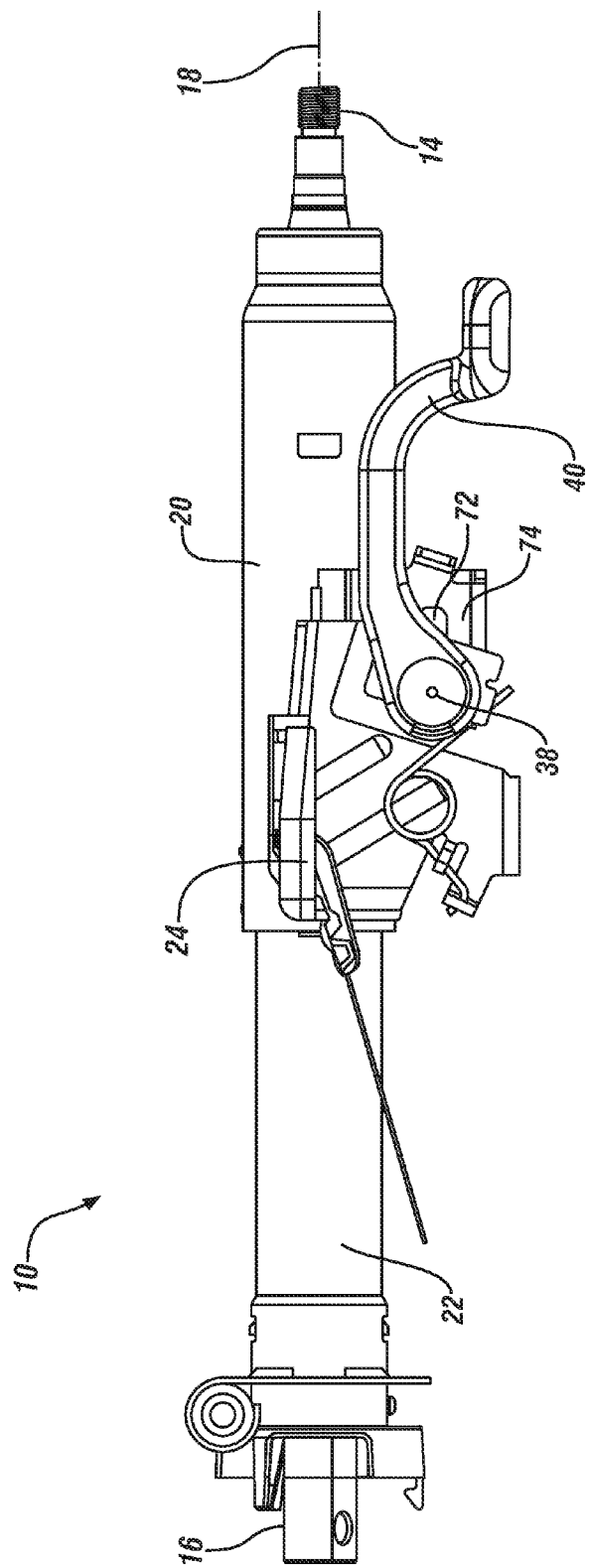
FIG. 6 is a schematic view of another embodiment of a steering column assembly.
Figure 7:
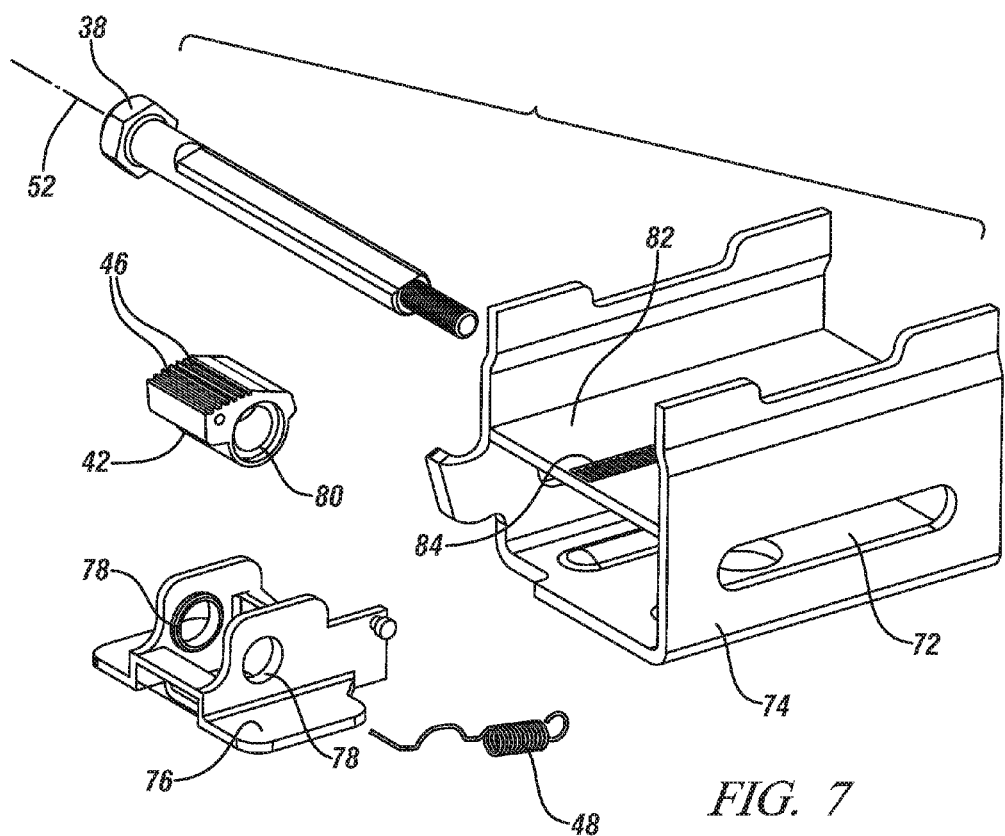
FIG. 7 is an exploded view of an embodiment of a telescope lock mechanism for a steering column assembly.
Figure 8:
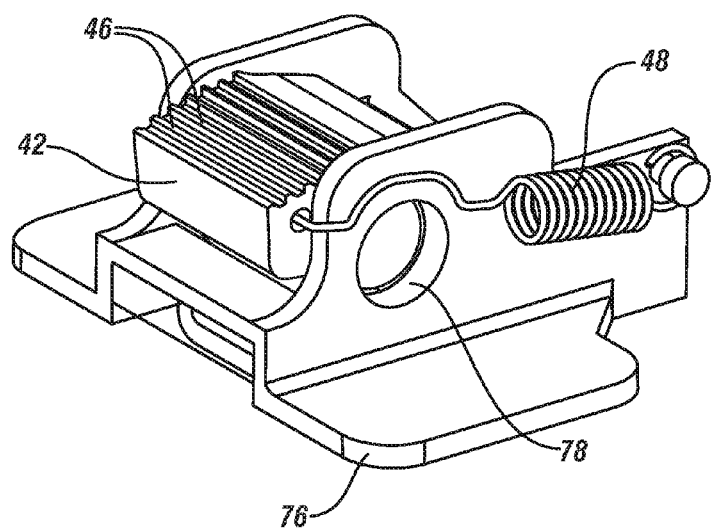
FIG. 8 is a perspective view of a partially assembled telescope lock mechanism for a steering column assembly.

FIG. 6 illustrates an embodiment of a telescope lock for a steering column assembly 10 where the lower jacket 22 is slidably located at least partially in the upper jacket 20. In other words, the relative positions of the upper jacket 20 and lower jacket 22 are substantially reversed from those of the steering column assembly of FIG. 1. This embodiment the locking bolt 38 extends from the adjustment lever 40 through a compression bracket slot 72 in a compression bracket 74 secured to the upper jacket 20 via the rake bracket 24. Referring to FIGS. 7 and 8, a carrier 76 is disposed in the compression bracket 74 and is configured to hold the cam 42. The locking bolt 38 extends into the compression bracket 74 and through carrier openings 78 in the carrier 76 and through a cam opening 80 in the cam 42. A spring 48 is connected at one end to the carrier 76 and at another end to the cam 42 to bias a position of the cam 42 about the bolt axis 52. The compression bracket 74 includes a support plate 82 having a plurality of support teeth 84 meshable with the plurality of cam teeth 46.

Figure 9:
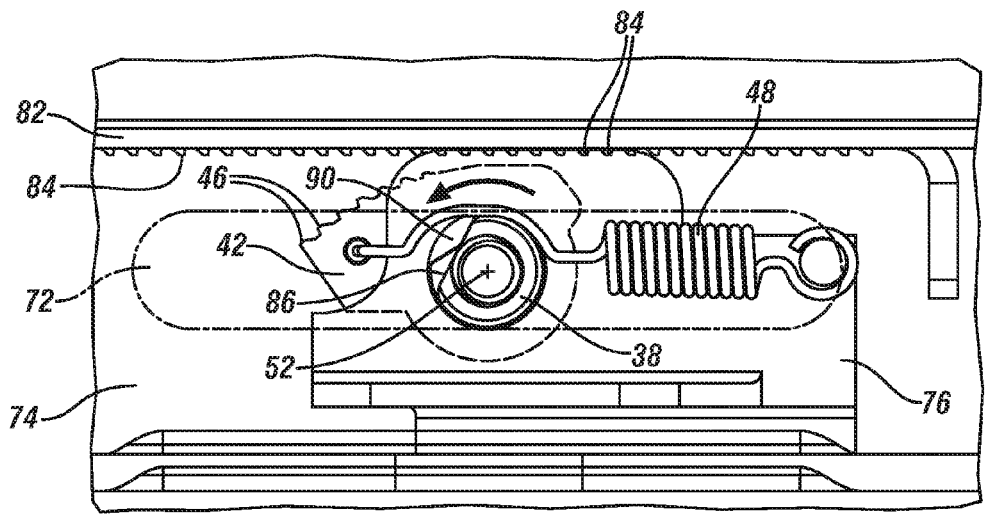
FIG. 9 is a cross-sectional view of an embodiment of a telescope lock position in an unlocked position.
Figure 10:
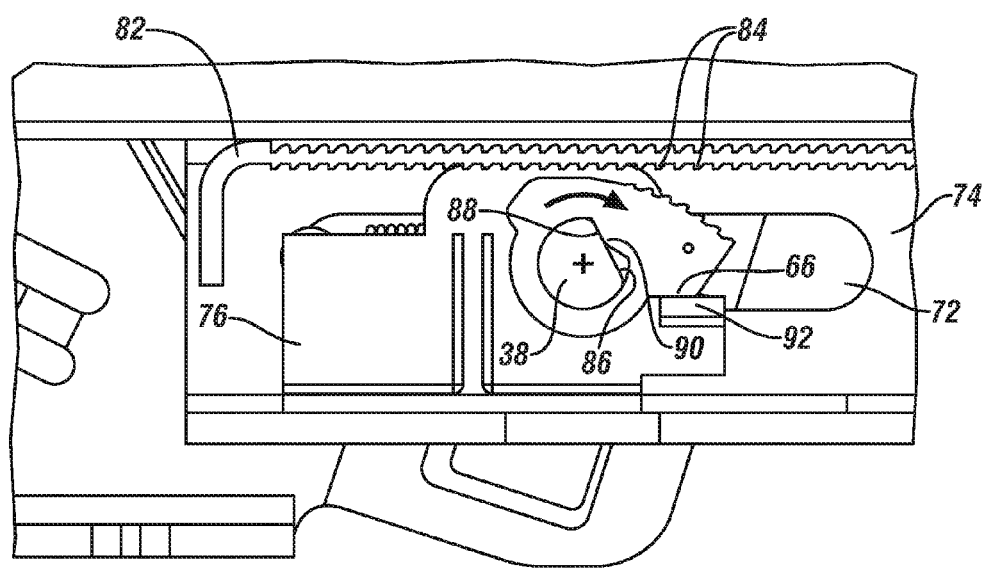
FIG. 10 is another cross-sectional view of an embodiment of a telescope lock position in an unlocked position.

Referring to FIGS. 9 and 10, the lock mechanism is shown in an unlocked position. When the user desires to adjust the position of the steering column 12, the user rotates the adjustment lever 40 to the unlocked position, in this view, by rotating the adjustment lever 40 in counterclockwise direction. This, in turn, causes the locking bolt 38 to rotate in a counterclockwise direction about the bolt axis 52. In this embodiment, the locking bolt 38 has a bolt flat 86 which engages a tab edge 88 of a cam tab 90 in the cam opening 80 as the locking bolt 38 rotates. The locking bolt 38 and bolt driver 52 continue to rotate, thus also rotating the cam 42 toward a first stop 92 until the leading face 66 of the cam 42 contacts the first stop 92. With the cam 42 in this position, the spring 48 acts to hold the leading face 66 in contact with the first stop 92, preventing the cam teeth 46 from moving into engagement with the support teeth 84. The user can then adjust the position of the steering column 12 without noise from inadvertent contact between the cam teeth 46 and support teeth 84. Further, since the spring 48 is holding the cam 42 in position, no torque is applied to the adjustment lever 40, so no additional effort in moving the adjustment lever 40 is experienced by the user.

Figure 11:
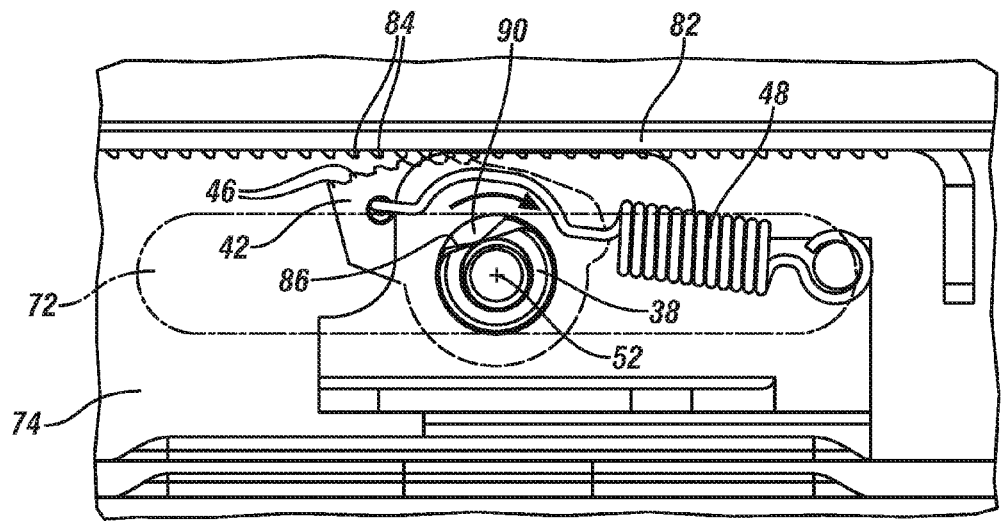
FIG. 11 is a cross-sectional view of an embodiment of a telescope lock position in a locked position.
Figure 12:
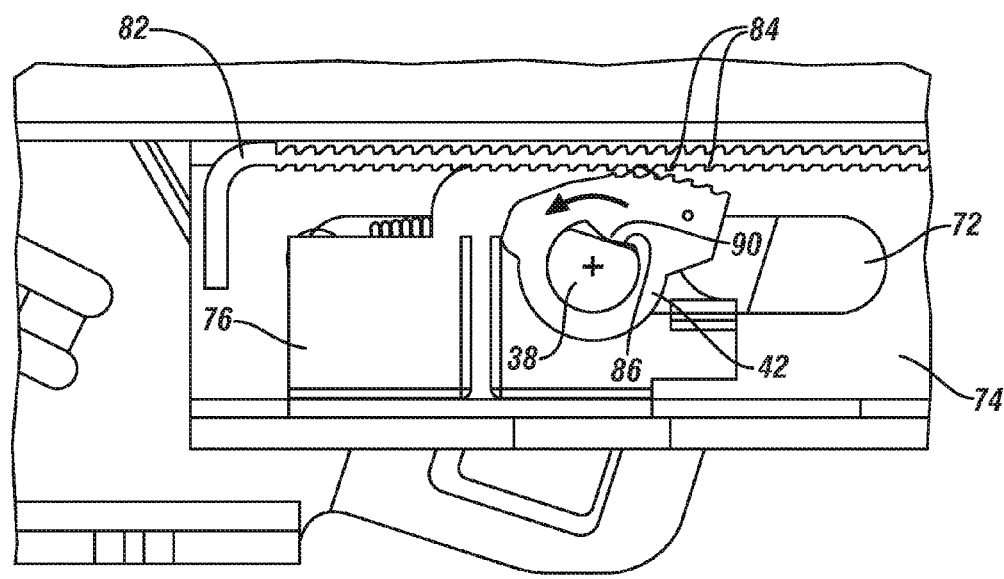
FIG. 12 is another cross-sectional view of an embodiment of a telescope lock position in a locked position.

Referring now to FIGS. 11 and 12, the mechanism is shown in a locked position. The mechanism is engaged when the user rotates the adjustment lever 40 from the unlocked position to the locked position. When this is done, the locking bolt 38 is rotated clockwise thus contacting an opposing tab edge 88 of the cam tab 90. As the adjustment lever 40 is continued in rotation, the rotation of the locking bolt 38 drives the cam teeth 36 into contact with the support teeth 84. In this position, the spring axis 68 acts to retain the cam teeth 36 in contact with the support teeth 84. Now that the adjustment lever 40 is in the locked position, the support teeth 84 and cam teeth 46 are aligned so that a sufficient crash release load acting on the steering column 12 will cause the support teeth 84 to engage the cam teeth 46, thus locking the telescope position of the steering column 12 to obtain increased control of energy absorption throughout the impact.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed:

1. A telescope lock mechanism for a steering column comprising:
   a plurality of column teeth operably connected to the steering column;
   an adjustment lever operably connected to the steering column to allow user adjustment of a position of the steering column;
   a locking bolt extending from the adjustment lever;
   a cam disposed at the locking bolt and rotatable thereon, the cam including:
      one or more tab features interactive with the locking bolt such that rotation of the locking bolt engages the tab features with the locking bolt to drive rotation of the cam between a locked and unlocked position; and
      a plurality of cam teeth meshable with the plurality of column teeth when the cam is in a locked position;
   a spring operably connected to the cam to maintain the cam position in the locked and/or unlocked position when the cam is rotated thereto; and
   a spring axis of the spring disposed between the cam teeth and a bolt axis of the locking bolt when the cam is disposed in the locked position.

2. The telescope lock mechanism of claim 1, wherein the cam is eccentrically-shaped.

3. The telescope lock mechanism of claim 1, wherein the plurality of column teeth are disposed at an energy absorbing strap, the locking bolt extending between the energy absorbing strap and the steering column.

4. The telescope lock mechanism of claim 3, wherein the energy absorbing strap is secured to an upper jacket of the steering column assembly.

5. The telescope lock mechanism of claim 3, wherein the spring is secured at a first end to the cam and at a second end to the steering column.

6. The telescope lock mechanism of claim 1, wherein the locking bolt is operably connected to the cam via a recess in the cam.

7. The telescope lock mechanism of claim 6, wherein a bolt driver secured to the locking bolt is at least partially insertable into the recess to operably connect the cam to the locking bolt.

8. The telescope lock mechanism of claim 1, wherein the meshing of the column teeth with the cam teeth occurs with an application of a crash release load to the steering column.

9. The telescope lock mechanism of claim 1, wherein when the cam is disposed in the unlocked position, a bolt axis of the locking bolt is disposed between a spring axis of the spring and the cam teeth.

10. A steering column assembly comprising:
    a lower jacket;
    an upper jacket slidably disposed in the lower jacket;
    an adjustment lever operably connected to the upper jacket and/or the lower jacket to allow user adjustment of a position of the upper jacket relative to the lower jacket along a column axis; and
    a telescope lock mechanism in operable communication with the upper jacket and the lower jacket comprising:
       a plurality of column teeth operably connected to the upper jacket;
       a locking bolt extending from the adjustment lever;
       a cam disposed at the locking bolt and rotatable thereon, the cam including:
          one or more tab features interactive with the locking bolt such that rotation of the locking bolt engages the tab features with the locking bolt to drive rotation of the cam between a locked and unlocked position; and
          a plurality of cam teeth meshable with the plurality of column teeth when the cam is in a locked position;
       a spring operably connected to the cam to maintain the cam position in the locked and/or unlocked position when the cam is rotated thereto; and
       a spring axis of the spring disposed between the cam teeth and a bolt axis of the locking bolt when the cam is disposed in the locked position.

11. The steering column assembly of claim 10, wherein the cam is eccentrically-shaped.

12. The steering column assembly of claim 10, wherein the plurality of column teeth are disposed at an energy absorbing strap, the locking bolt extending between the steering column and the energy absorbing strap.

13. The steering column assembly of claim 12, wherein the energy absorbing strap is secured to the upper jacket.

14. The steering column assembly of claim 12, wherein the spring is secured at a first end to the cam and at a second end to the steering column.

15. The steering column assembly of claim 10, wherein the locking bolt is operably connected to the cam via a recess in the cam.

16. The steering column assembly of claim 15, wherein a bolt driver secured to the locking bolt is at least partially insertable into the recess to operably connect the cam to the locking bolt.

17. The steering column of claim 10, wherein the meshing of the column teeth with the cam teeth occurs with an application of a crash release load to the steering column assembly.

18. The steering column assembly of claim 10, wherein when the cam is disposed in the unlocked position, a bolt axis of the locking bolt is disposed between a spring axis of the spring and the cam teeth.

* * * * *